June 8, 1937. W. R. KEEVER Re. 20,398

REMOVABLE STRAIGHTENING TOOL

Original Filed Nov. 6, 1934

INVENTOR
William R. Keever
BY
Hoyt, Mary & Campbell ATTORNEYS

Reissued June 8, 1937

Re. 20,398

UNITED STATES PATENT OFFICE 20,398

REMOVABLE STRAIGHTENING TOOL

William R. Keever, Sulphur Mine, La., assignor to The Union Sulphur Company, a corporation of New Jersey Original No. 2,065,896, dated December 29, 1936, Serial No. 751,688, November 6, 1934. Application for reissue February 16, 1937, Serial No. 125,977

9 Claims. (Cl. 255—1)

My invention relates to rotary earth drilling and more particularly to a device used in changing the direction of the bore of the well being drilled.

In rotary drilling it is sometimes desirable to change the direction in which the hole is being drilled; for example, an intended vertical hole actually may be being bored at an angle, and it becomes necessary to change the direction of bore of the hole to its original vertical direction. In some cases when drilling a normally vertical hole, it may be desirable to have the hole proceed at an angle to the vertical axis to avoid certain formations or to lead to other formations.

The principal object of my invention is to provide a device which may be used in changing the direction of bore of a well.

Another object of my invention is the construction of a tool which may be removed easily with the drill after the hole has been given its new direction.

It is also an object of my invention to provide a device of such construction that after its use no side or "rat" holes will be left in the well.

A further object of my invention is the construction of a device which permits the drill to be subsequently raised without binding against and forming a wedge with the side of the tool, thus making difficult its removal.

An additional object of my invention is to provide a device in which the tool can be accurately and securely placed in a desired oriented position with reference to the new direction the hole is to take, and then freed from the drilling member and pipe to permit the latter to function independently and without disturbing the position of the tool.

Another object of my invention is the provision of a tool which can be rotated by the drill pipe at any time desired in order to secure its removal from the well in the event that the formations are of a type which tend to cause sticking of the tools in the hole.

A further object of my invention is the construction of a device in which the drill bit and connected mechanism are housed and protected by the tool as the device is being placed in and removed from the well.

Still another object of my invention is to construct a device that may be rapidly assembled or dismantled, facilitating the replacement of worn or damaged parts.

My invention has other objects and the device has other advantages and includes other features of novelty in addition to those above mentioned as will be apparent from consideration of the accompanying drawing forming a part of the specification, and in which.

Figure 4:
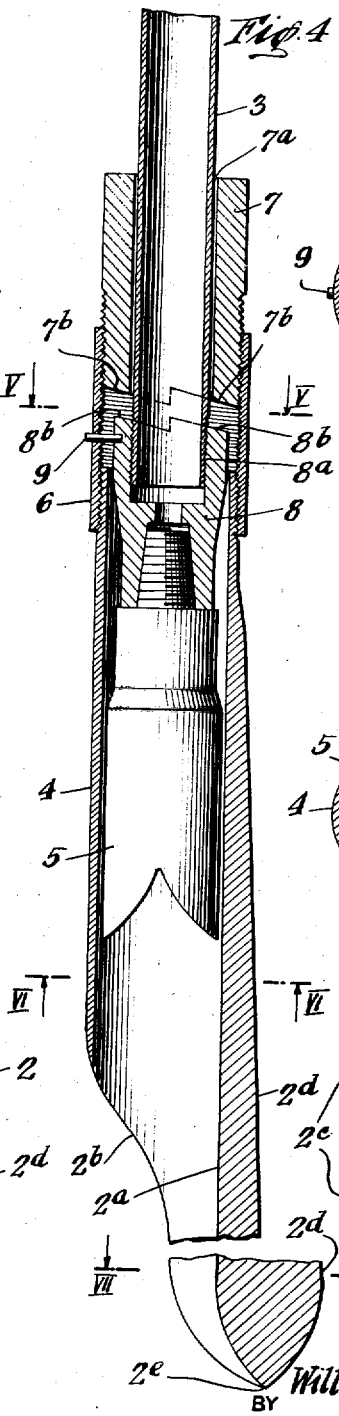
Figure 4 is a detail view showing a broken vertical section with an intermediate portion of the device omitted.
Figure 5:
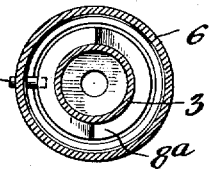
Figure 5 is a section taken along line V—V of Figure 4.
Figure 6:
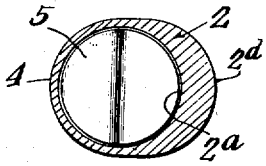

Figure 6 in a section taken along VI—VI of Figure 4.

Figure 7:
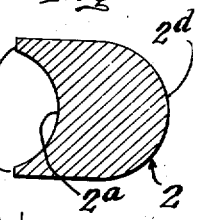

Figure 7 is a section taken along VII—VII of Figure 4.

Referring more particularly to the drawing, the device includes a tool which has a main body 2. This body may be either hollow or solid and is provided with a guiding surface or channel 2*a*, that functions to guide the tool in the formation of the new hole. In a vertical direction this channeled surface is straight and continuous and is in the same straight axis as the drill pipe 3 above the tool. The upper portion of the tool, as shown in Figure 6, is cylindrical in shape and comprises a long sleeve 4 which houses the drilling bit 5 and the mechanism which is employed in placing and removing the device from the hole. The inner surface of the sleeve is a continuation of the surface 2*a*. The sleeve is cut away at 2*b* so that the channel 2*a* is flanked on each side by protruding metal ridges 2*c* that serve in guiding the drill bit in its proper course. The outer side of the body is a tapering surface 2*d* which causes the bit 5 to be deflected as it moves downwardly. The bottom of the tool is provided with a point 2*e* for use in placing and securing it in the formation in the well. This portion 2 of the device is generally known as a whipstock.

A collar 6 is threaded on the top of the sleeve 4 and a bushing 7 is threaded into the upper portion of the collar. If it is desired, the collar may be made integral with the sleeve 4 or may be integrally formed with the bushing 7. The collar 6, therefore, serves to connect the bushing with the body. The bushing 7 has a central opening 7*a* through which the drill pipe 3 passes. The drill pipe 3 may be rotated or moved in a vertical direction through the opening 7*a* without moving the bushing or the body. The bushing 7 has a clutch face 7b formed on its downward side.

The drill bit 5 may be of any type desired and is secured in a drill collar 8. Threaded into the top of the drill collar at 8a is the drill pipe 3. The drill bit 5 and drill collar 8 may be moved vertically with the pipe 3. On the upper surface of the drill collar 8 is formed a clutch face 8b which is adapted to seat against and cooperate with the clutch face 7b of the bushing 7 when the drill pipe and collar are raised.

A shear pin (or pins) 9 passes through the collar 6 and into the drill collar 8. This pin secures the tool 2 to the drill pipe so that there will be no relative movement between them as the device is being lowered and correctly oriented in the hole. The strength of this pin 9 is sufficient to hold the tool 2 in fixed position permitting the proper placing of the tool in the hole and yet shear upon the imposing of additional weight of the drill pipe, so that thereafter the drill pipe and bit may move independently of the tool 2 which remains fixed in its oriented position.

Figure 1:
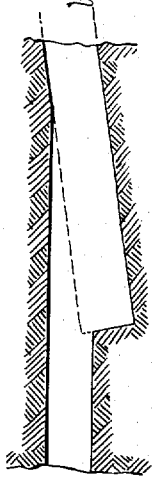
Figure 1 is a digram showing a well that has been given a new direction by my novel device.
Figure 2:
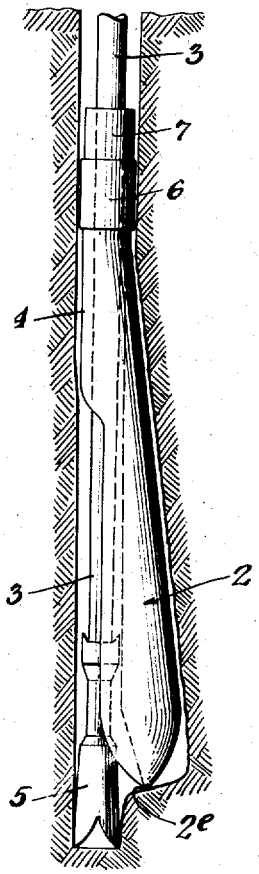
Figure 2 is a view showing my novel device being used for straightening a hole.
Figure 3:
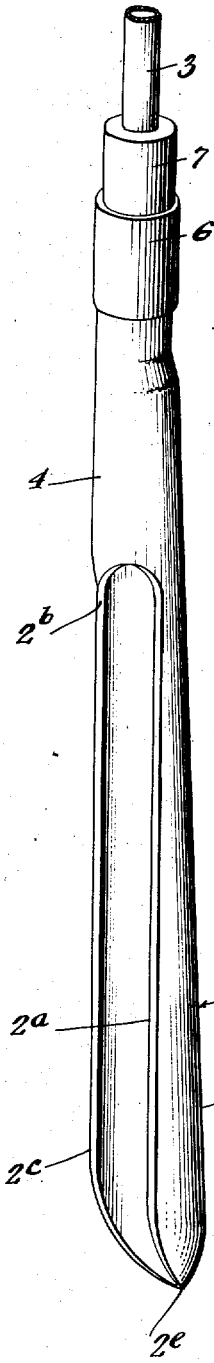
Figure 3 is a view of the outside of the device.

When the device is to be used, the parts are assembled by attaching the collar 6 to the bushing 7 and the sleeve 4, the shear pin 9 holding the tool 2 in a fixed position relative to the pipe as shown in Fig. 4. The assembly can be rapidly made on the drill floor or the apparatus can be quickly dismantled for the replacement of worn parts. No welding operation is necessary. The assembled device is lowered into the hole and the tool is then correctly oriented with reference to the new direction the hole is to take. The point 2e is secured in the formation to prevent movement of the tool during subsequent drilling. When additional weight is placed on the drill pipe 3, the pin 9 shears and the drill pipe 3, drill collar 8 and bit 5 are free from the tool. The pipe 3 and bit 5 are then rotated in the customary manner while the tool 2 remains stationary. As the drill pipe 3 is rotated, it moves down through the opening 7a and forces the bit 9 along the channel 2a. The side walls 2c give the bit direction to prevent sliding off to either side. The increasing outer thickness of the tool 2 at its lower end, as indicated at 2d, acts to force the bit against the opposite side wall of the hole and thus starts the rotary bit boring in a new direction. By the time the drill has reached the lower end of my whipstock 2, as shown in Figure 2, the well will have been given a definite new direction and drilling may be continued or the whipstock 2 may be removed before continuing.

When it is desired to remove the bit 5 or whipstock 2, the drill pipe 3 is raised and the bit 5 recedes into the sleeve 4. The clutch face 7b engages the clutch face 8b and as the drill pipe 3 is further raised, the tool 2 will be lifted along with the pipe. Should the tool stick in the formation, the drill pipe 3 may be rotated and through the clutch faces the rotation imparted to the tool 2. Such rotational or twisting movement will assist in freeing the tool from the engaging or sticking formations.

It is desirable to use a shear pin 9 which is sufficiently strong to permit the whipstock to be placed in proper position without shearing and yet which is not of such strength that the whipstock will be disturbed once it is positioned by the operation of shearing the pin to permit rotation of the bit 5. However, should the pin 9 be sheared before the tool is finally positioned, it will be noted that control over the whipstock is not entirely lost for by raising the drill stem 3 slightly, the clutch faces 7b and 8b can be brought together and the whipstock thus rotated to the desired position.

By providing the inside of my whipstock with a vertical surface and placing the taper on the outer surface, I am enabled to provide side walls 2c throughout the effective length of the whipstock. As a result the channel 2a is substantially uniform throughout the effective length of the whipstock and the side walls 2c act to control the direction of the bit throughout the time the new direction is being imparted to the well.

By making the inside of my whipstock 2 in line or parallel with the vertical axis of the lower portion of the drill pipe and continuing this straight surface all the way to the bottom of the tool, the new corrected bore will begin at the very bottom of the old hole and thus the same hole will continue in the new direction. No new hole will be formed and thus no "rat" holes are left in the side walls of the well which would tend to engage the tools that are being lowered into the hole, and misdirect them into the end of the original rejected hole.

The inner face of the channel 2a being nontapering, I also avoid any wedging action of the bit against the inner face of the tool 2. If the inner face were tapered, there would be a certain undue amount of friction between the bit and the tool. If the bit were raised it would tend to raise the tool 2 along with the bit thus forming a wedge between the bit and the well wall which would prevent further upward movement. The vertical face 2a parallel with the axis, however, decreases the friction so that the undesirable wedging action will not take place. When using the device to straighten a well, the nontapering surface 2a also prevents the drill pipe from binding or bending as would be the case if the inner face of the tool were tapered. In my device the pipe remains in a substantially straight line.

In a device in which the tool is secured to the drill, a difficulty sometimes arises in that the drill becomes worn and must be replaced before the hole is finished. In this event the tool 2 is raised to the surface along with the worn drill. It is then sometimes difficult to reinsert the drill in the desired hole. In my invention, by eliminating the side holes, there is only one possible hole into which the tool can be reinserted and this admittedly difficult task is greatly simplified when my device is employed.

It is obvious that many modifications of the general and detailed structure of the device illustrated in the specification and accompanying drawing may be made without departing from the spirit and scope of my invention defined in the following claims.

I claim:

1. A drilling device including a drill member for forming a bore, a member acting to change the direction of the drilling member, frangible means positively connecting said drilling member and said direction changing member to prevent relative rotation therebetween in order that the direction changing member may be accurately positioned in the bore, said connection being adapted to be broken before the direction of the bore is changed, and clutch means for connecting said members prior to their removal of the bore after the direction of the bore has been changed.

2. A drilling means including a drilling member, means acting to change the direction of the drilling member, a shear pin connecting them and adapted to be broken, and a clutch means for interconnecting them when the drilling member is raised.

3. A drilling means comprising a drill pipe, a drill collar secured to the end thereof, a drill bit secured in said drill collar, a clutch face formed on the upper surface of said drill collar, a tool adapted to change the direction of said drilling means, a connecting collar secured to said tool, a shear pin securing said connecting collar to said drill collar, a bushing with an opening therein secured in said connecting collar, said drill pipe passing through said opening, and a clutch face formed on the bottom surface of said bushing.

4. A drilling means comprising a drill pipe, a drill collar secured to the end thereof, a drill bit secured in said drill collar, a clutch face formed on the upper surface of said drill collar, a tool adapted to change the direction of said drilling means, a connecting collar secured to said tool, a shear pin securing said connecting collar to said drill collar, a bushing with an opening therein secured in said connecting collar, said drill pipe passing through said opening, a clutch face formed on the bottom of said bushing, said body member being formed with a curved inner channel that is in the same vertical axis as the drill pipe and a tapering outer surface that is at an angle to the vertical axis of the drill pipe.

5. A drilling means comprising a drill pipe, a drill collar secured to the end thereof, a drill bit secured in said drill collar, a clutch face formed on the upper surface of said drill collar, a tool adapted to change the direction of said drilling means, a connecting collar secured to said tool, a shear pin securing said connecting collar to said drill collar, a bushing with an opening therein secured in said connecting collar, said drill pipe passing through said opening, a clutch face formed on the bottom of said bushing, said body member being formed with a curved inner channel that is in the same vertical axis as the drill pipe and is substantially uniform throughout its length, and a tapering outer surface that is at an angle to the vertical axis of the drill pipe.

6. A drilling means for changing the direction of a well comprising a drill pipe, a drill secured to the end thereof, a tool adapted to be contacted by said drill to change the direction of said drill, a shear pin connecting said drill to said tool whereby movement of said drill pipe may be imparted to said tool to orient the same, said shear pin being adapted to be broken after orientation of said tool, clutch means interconnecting said drill and said tool whereby longitudinal and rotational movement of said drill stem may be imparted to said tool to remove the same after a drilling operation, said tool having a tapering outer surface and a straight inner surface comprising a channel laterally curved to form side walls which extend throughout the length of said inner surface, whereby said drill is confined in direction throughout its travel in contact with said tool.

7. A drilling means for changing the direction of a well comprising a drill pipe, a drill secured to the end thereof, a tool adapted to be contacted by said drill to change the direction of the drill, a shear pin connecting said drill to said tool whereby movement of said drill pipe may be imparted to said tool to orient the same, said shear pin being adapted to be broken after orientation of said tool, said tool having a tapering outer surface and a straight inner surface comprising a channel laterally curved to form side walls which extend throughout the length of said inner surface, whereby said drill is confined in direction throughout its travel in contact with said tool.

8. In combination, a drill, and a whipstock for changing the direction of said drill, said whipstock comprising means for holding it in an earth formation, a curved inner surface having a straight vertical axis and an outer tapering surface, said drill being adapted to rotate against said inner surface as it moves downward during the drilling operation, said inner surface comprising a channel extending throughout the length of said inner surface and including side walls for confining said bit in said channel throughout the length of its travel against said inner surface.

9. A whipstock for changing the direction in which a well is being drilled and adapted to be held securely in an earth formation during said drilling, comprising an inner surface for directing and guiding a drill in the new direction and an outer surface at an angle to said inner surface, said inner surface being substantially uniform throughout its length and comprising a curved channel having side guides extending throughout the length of said channel.

WILLIAM R. KEEVER.